(12) United States Patent
Cutcliffe et al.

(10) Patent No.: US 8,704,897 B1
(45) Date of Patent: Apr. 22, 2014

(54) CAMERA COMMUNICATION SYSTEMS AND METHODS

(75) Inventors: Neil Cutcliffe, Goleta, CA (US);
Marinus Cornelius De Jong, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 844 days.

(21) Appl. No.: 12/555,649

(22) Filed: Sep. 8, 2009

Related U.S. Application Data

(60) Provisional application No. 61/096,205, filed on Sep. 11, 2008.

(51) Int. Cl.
*H04N 5/232* (2006.01)
*H01L 27/00* (2006.01)

(52) U.S. Cl.
USPC .................................. 348/207.99; 250/208.1

(58) Field of Classification Search
USPC ................. 348/114, 143–160, 207.99, 211.6; 250/208.1, 363.02, 363.04, 370.08
See application file for complete search history.

(56) References Cited

U.S. PATENT DOCUMENTS

| | | | |
|---|---|---|---|
| 5,383,368 A * | 1/1995 | Franke et al. | 73/800 |
| 6,649,737 B1 * | 11/2003 | Hillman et al. | 530/350 |
| 7,456,863 B2 * | 11/2008 | Nakajima | 348/211.14 |
| 7,551,200 B2 * | 6/2009 | Okada et al. | 348/207.11 |
| 7,612,799 B1 * | 11/2009 | Frank et al. | 348/164 |
| 7,738,011 B2 * | 6/2010 | Ito | 348/211.11 |
| 8,040,384 B2 * | 10/2011 | Mayuzumi | 348/211.3 |
| 8,094,201 B2 * | 1/2012 | Misawa et al. | 348/211.11 |
| 8,146,124 B2 * | 3/2012 | Kitagawa | 725/105 |
| 8,184,169 B2 * | 5/2012 | Ortiz | 348/211.8 |

* cited by examiner

*Primary Examiner* — Sinh Tran
*Assistant Examiner* — Tuan Le
(74) *Attorney, Agent, or Firm* — Haynes and Boone, LLP

(57) ABSTRACT

Various systems and methods are provided to implement a flexible approach to the remote control of camera systems. For example, camera systems and related methods may be implemented to recognize a protocol that supports a multi-tiered configuration of camera system components. In one example, routing tables may be maintained at various tiers of a camera system to facilitate the selective routing or execution of commands at different tiers in a hierarchical manner. In one example, the routing tables may be dynamically built and may include routing information related to lower level tiers but not higher level tiers.

18 Claims, 6 Drawing Sheets

CAMERA COMMUNICATION SYSTEMS AND METHODS

CROSS-REFERENCE TO RELATED APPLICATIONS

This application claims the benefit of U.S. Provisional Patent Application No. 61/096,205 filed on Sep. 11, 2008 and entitled "CAMERA COMMUNICATION SYSTEMS AND METHODS" which is incorporated herein by reference in its entirety.

TECHNICAL FIELD

The present disclosure relates generally to cameras and, more particularly, to the control and communication of cameras.

BACKGROUND

Cameras are often deployed in remote locations for a variety of applications such as, for example, thermal imaging, photography, and other uses. Various techniques have been developed for controlling cameras situated in remote locations.

For example, in one approach, existing camera communication techniques may be used to provide various commands to cameras and related components. Unfortunately, existing camera communication techniques often have limited flexibility which reduces their usefulness. In particular, such techniques typically provide only a single level of device communication. In this regard, a single protocol interpreter (e.g., such as an adapter board connected to a camera) is required to interpret all commands of a protocol and provide appropriate signaling to the camera or related components for executing such commands.

In practice, this approach is often cumbersome to implement. For example, if a camera is upgraded to support new features, software and/or hardware of the protocol interpreter must be upgraded to support commands used to control the new features. Similarly, if new components are added to a camera system, the protocol interpreter must also be upgraded to support the control of the new components. Thus, there is a need for an improved approach that flexibly supports the control of remote cameras and related components.

SUMMARY

In accordance with embodiments described herein, various systems and methods are provided to implement a flexible approach to the remote control of camera systems. For example, camera systems and related methods may be implemented to recognize a protocol that supports a multi-tiered configuration of camera system components. Routing tables may be maintained at various tiers of a camera system to facilitate the selective routing or execution of commands at different tiers in a hierarchical manner. In one embodiment, the routing tables may be dynamically built and may include routing information related to lower level tiers but not higher level tiers.

In another embodiment, a method of controlling a camera system includes a plurality of tiers of components. The method includes receiving a command at a first one of the tiers; selectively executing the command at a first business logic block of the first tier or routing the command to a second one of the tiers based on first routing information in a first routing table of the first tier; and if the command is routed to the second tier, selectively executing the command at a second business logic block of the second tier based on second routing information in a second routing table of the second tier.

In another embodiment, a camera system includes a first tier of components comprising: a first command handler, a first business logic block adapted to execute commands directed to the first tier, and a first routing table; a second tier of components comprising: a second command handler, a second business logic block adapted to execute commands directed to the second tier, and a second routing table; wherein the first routing table comprises first routing information adapted to selectively cause the first command handler to provide a command to the first business logic block for execution or to route the command to the second tier; and wherein the second routing table comprises second routing information adapted to selectively cause the second command handler to provide the command to the second business logic block for execution if the command is routed from the first tier to the second tier.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
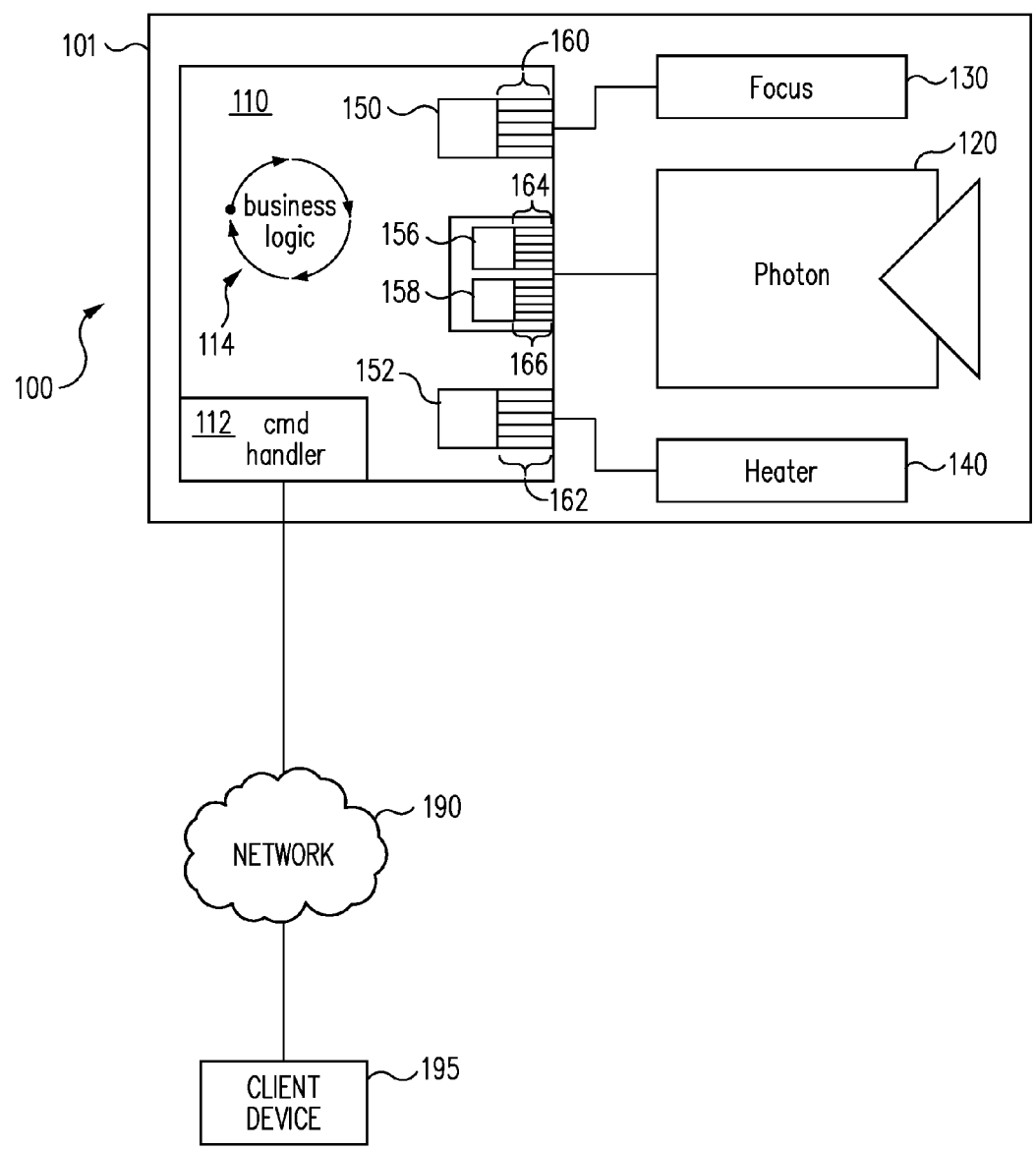
FIGS. 1-4 illustrate camera systems in accordance with several embodiments of the invention.

In accordance with various techniques described herein, components (e.g., including high level components and lower level subcomponents) of a camera system may be controlled using a camera control protocol (also referred to as "FLIR-ish"). In one embodiment, the camera control protocol may be used to control one or more infrared cameras (e.g., PHOTON™ thermal imaging cameras and related devices available from FLIR Systems, Inc. of North Billerica, Mass.). In other embodiments, different types of cameras or devices may be controlled.

In one embodiment, a multi-tiered approach is provided in which commands and responses may be exchanged between various components of the camera system and other devices according to a camera control protocol. Various components of the camera system may be associated together in a hierarchy of sets referred to herein as "tiers." In this regard, one or more routing tables may be maintained in each tier. These routing tables may include information that may be used by each tier to choose whether to execute a command at the tier or route the command to a lower level tier in the hierarchy. Components of the camera system may be configured to dynamically build the routing tables. In this regard, devices may send inquiries and receive responses from other devices identifying the available functions, components, and/or other features thereof.

The camera control protocol may be passed over any appropriate interface using any appropriate signaling. For example, in one embodiment, commands and responses may be passed using a HyperText Transfer Protocol common gateway interface (HTTP CGI) familiar to those skilled in the art. Other types of signaling and communication mediums may be used, such as Universal Serial Bus (USB), Firewire, Ethernet (e.g., using RJ45 connections), direct electrical connections (e.g., RS232 serial interfaces), and/or other appropriate types of signaling and communication mediums.

In one embodiment, the camera control protocol may be implemented as a text-based, human readable, and asymmetric protocol using simple grammar with punctuation symbols to format commands provided from a client device (e.g., the requestor) to a camera system. Reponses provided from the camera system to the client device may be formatted, for example, in Java Script Object Notation (JSON). In various embodiments, different camera systems may recognize different command vocabularies and thus may support different commands.

The following Table 1 provides an example of a command vocabulary that may be supported by a camera system, such as an M-Series pan and tilt camera available from FLIR Systems, Inc.:

TABLE 1

| COMPONENT | COMMAND |
| --- | --- |
| focus motor | percent |
|  | autofocus |
|  | speed |
|  | startRow |
|  | endRow |
|  | startCol |
|  | endCol |
|  | algorithm |
| automatic gain control | lowlimit |
|  | highlimit |
|  | sharpen |
|  | brightness |
|  | contrast |
|  | fine |
|  | lut |
|  | roi |
|  | damper |
| pan motor | x |
|  | y |
| tilt motor | x |
|  | y |

In Table 1, several components of a camera system are identified including a focus motor, an automatic gain control, a pan motor, and a tilt motor. For each component in Table 1, several functions are identified which may be specified in a command directed to the component.

Components of the camera system may be configured to dynamically build routing tables which may be used to route commands to various locations of the camera system. In this regard, devices may send inquiries and receive responses from other devices identifying the available functions, components, and/or other features thereof.

In one embodiment, the client device may send requests in accordance with the camera control protocol to a camera system having one or more components. Each request may include one or more commands that instruct the camera system to perform a function or to report a status. A component of the camera system may parse the request into separate commands and either execute the commands or route them to individual components (e.g., subsystems) of the camera system for execution. The components of the camera system may send responses in reply to the requests which identify the execution status of the commands. In one embodiment, the camera system may collect the responses to each command provided in a single request and send the responses to the client device in the same order as the commands were provided in the original request.

In one embodiment, the requests sent by the client device may be provided in the following format: ?<FLIRish request> [@<checksum>] [<newline>].

In this embodiment, the requests are formatted as a "?" character followed by one or more commands (labeled "FLIRish request"), an optional "@" character delimiting an optional checksum, and an optional newline line terminator.

In this embodiment, the "?" character identifies the start of the request. Accordingly, when requests are carried over an RS232 serial connection, the "?" character is the first character in the request. When requests are carried as payloads in HTTP commands, the "?" character delineates the request from the preceding part of a Uniform Resource Locator (URL).

In one embodiment, the newline character may be used if an underlying transmission protocol does not provide a count of the bytes in the one or more commands included in the request. For example, if the request is provided as a payload of an HTTP message (e.g., which provides a payload byte count in this example), then no newline character is required. As another example, if the request is provided over an RS232 serial connection (e.g., which does not provide a payload byte count in this example), then a newline character may be used to terminate the request.

In one embodiment, the @ character is only used if the request includes a checksum. In this case, the @ character is a delimiter between the end of the command and the beginning of the checksum. For example, if the request is provided as a payload of an HTTP message (e.g., which provides a checksum of its payload in accordance with a Transmission Control Protocol (TCP) in this example), then no @ character and no checksum are required. However, the @ character and a checksum may be optionally included as part of the payload if desired. As another example, if the request is provided over an RS232 serial connection (e.g., which does not provide a checksum in this example), then the @ character and a checksum may be optionally provided after the command if desired.

In this embodiment, the optional checksum may be used, for example, where the camera control protocol is transmitted over potentially noisy serial connections. In cases where the integrity of a request is only preserved by an in-line checksum, a checksum may be used. If the checksum is not present and a newline line terminator is found, then the request will be parsed and the commands as decoded will be executed.

Each command included in the "FLIRish request" may identify a particular function to be performed by a particular component of a camera system. In one embodiment, commands may be path-based or instance-based.

For example, in a path-based command, the command may identify a "path" that corresponds to a hierarchical list of one or more devices and/or components of the camera system to specify a target location in the camera system. The path-based command may also identify a group, a function, and/or arguments. In this example, a "device" refers to a device of the camera system which may have one or more components. A "component" refers to a component of the camera system (e.g., a component of a device). A "group" refers to a set of functions (e.g., several related functions may be included in a group). A "function" refers to a particular function to be performed in response to the command. "Arguments" refer to particular parameters for the command (e.g., a particular value used for executing the command).

As another example, in an instance-based command, the command may identify an instance which corresponds to an ordinal number of the occurrence of a function in a routing table of the camera system. For example, in a camera system with multiple cameras supporting identical functions, two different cameras may each be implemented to support a particular function (e.g., a zoom function). A routing table of the camera system may include separate entries for the function, with a first entry associated with a first camera, and a second entry associated with a second camera. In this example, a command specifying an instance value of "1" may be routed to the component associated with the first entry of the function (e.g., routed to the first camera). Likewise, a command specifying an instance value of "2" may be routed to the component associated with the second entry of the function (e.g., routed to the second camera). Accordingly, commands may specify instance values to direct the commands to particular cameras.

In one embodiment, a request may be formatted in accordance with Backus-Naur grammar set forth in the following Table 2:

TABLE 2

<FLIRish request> : := '?' [<device>] <command_list> ['@' <checksum>]
<device> : := <alpha_numeric> ':'
<command_list> : := [<command_list> ';'] <command> [',' <command>]
<command> : := [<component_list> | <instance>] [<group>] <function> ['=' <argument>]
<component_list> : := [<component_list> ':'] <component>
<component> : := <non_numeric> ':'
<instance> : := <numeric> ':'
<group> : := <non_numeric> '.'
<function> : := <non_numeric>
<argument> :== <alpha_numeric>
<checksum> : := <numeric>
<alpha_numeric> : := AlphaNum
<numeric> : := NumericOnly
<non_numeric> : := AlphaNum and not NumericOnly The following Table 3 provides several examples of requests using path-based commands in accordance with the Backus-Naur grammar of Table 2:

TABLE 3

| REQUEST FORMAT | EXAMPLE IMPLEMENTATION | COMMENTS |
|---|---|---|
| ?<function> | ?zoom | Perform zoom. |
| ?<function>=<argument> | ?zoom=1 | Perform zoom using value of 1. |
| ?<function>=<argument>; <function>=<argument> | ?zoom=1;tilt=37 | Perform zoom using value of 1; perform tilt using value of 37. |
| ?<group>.<function>= <argument> | ?focus.percent=50 | Perform focus using value of 50 percent. |
| ?<group>.<function>= <argument>,<function>= <argument> | ?pan.x=140,y=45 | Perform pan using x value set to 140 and y value set to 45. |

TABLE 3-continued

| REQUEST FORMAT | EXAMPLE IMPLEMENTATION | COMMENTS |
|---|---|---|
| ?<component>:<function>= <argument> | ?photon:zoom=1 | Perform zoom in photon component using value of 1. |
| ?<device>: :<component>: <group>.<function>= <argument> | ?PTZ300: :photon: pan.x=50 | Perform pan in photon component of PTZ300 device using x value set to 50. |
| ?<device>: :<function>= <argument>;<component>: <group>.<function>= <argument> | ?PTZ300: :zoom=1; photon:pan.x=50 | Perform zoom in PTZ300 device using value of 1; perform pan in photon component of PTZ300 device using x value set to 50. |

The following Table 4 provides several examples of requests using instance-based commands in accordance with the Backus-Naur grammar of Table 2:

TABLE 4

| REQUEST FORMAT | EXAMPLE IMPLEMENTATION | COMMENTS |
|---|---|---|
| ?<instance>:<function>= <argument> | ?2:zoom=1 | Perform zoom set to value of 1 in component corresponding to the second entry of a zoom function in routing table. |
| ?<instance>:<function>= <argument>,<function>= <argument> | ?2:x=140,y=45 | Perform functions x and y using values of 140 and 45 in component corresponding to the second entry of functions x and y in routing table. |
| ?<instance>:<group>. <function >=<argument> | ?2:pan.x=130 | Perform function x (in pan group of functions) using value of 130 in component corresponding to the second entry of group pan and function x in routing table. |
| ?<device>: :<instance>: <group>.<function>= <argument> | ?3: :2:focus.percent=50 | Perform focus at 50 percent in component of device 3 corresponding to the second entry of group focus and function percent in routing table. |
| ?<device>: :<function>= <argument>;<instance>: <function>=<argument> | ?3: :x=140;2:zoom=1 | Perform function x using value of 140 in device 3; perform zoom set to value of 1 in component of device 3 corresponding to the second entry of function zoom in routing table. |

Responses may be provided by components of the camera system in reply to requests. For example, in one embodiment, responses may be provided in accordance with JavaScript Object Notation (JSON) data interchange format familiar to those skilled in the art.

The following Table 5 provides examples of various responses that may be provided in accordance with JSON format:

TABLE 5

| EXAMPLE REQUEST | EXAMPLE RESPONSE | COMMENTS |
|---|---|---|
| ?pan,tilt,focus | { "pan" : {"position":"246", "direction":"left", "speed":"12"}, "tilt" : {"position":"28", "direction":"down", "speed":"4"}, "focus": {"position":"63", "direction":"in", "speed":"0"} } | Return information identifying pan, tilt, and focus parameters. |
| ?pan | {"pan" : {"position":"246", "direction":"left", "speed":"12"}} | Return information identifying pan parameters. |
| ?3: :pan,tilt,focus | {"dev" : "3", "pan" : {"position":"246", "direction":"left", "speed":"12"}, "tilt" : {"position":"28", "direction":"down", "speed":"4"}, "focus" : {"position":"63", "direction":"in", "speed":"0"} } | Return information identifying pan, tilt, and focus parameters for device 3. |

In one embodiment, a camera system may support a "help" command which may be executed by various components of the camera system to provide information to a client device identifying the type and name of each component in the camera system as well as the groups and functions associated with each component.

In another embodiment, a camera system may support a "build-routes" command which may be executed by various components of the camera system to provide information in the same manner as the help command. In addition, the build-routes command may cause various components of the camera system to create routing tables maintained by the components for routing commands between the components.

FIGS. 1-4 illustrate various camera systems that may be implemented to support the routing of various requests and responses in accordance with the camera control protocol. For example, FIG. 1 illustrates a camera system 100 in communication with a client device 195 (e.g., an external device) over a network 190 (e.g., a wired or wireless network) in accordance with an embodiment. Camera system 100 includes a camera 101 having a logic board 110, a camera core 120 (e.g., used for infrared or non-infrared detection), a focus motor 130, and a heater 140. Logic board 110 (also referred to as a Photon Interface Board) receives requests from client device 195 in accordance with the camera control protocol over an appropriate interface. Logic board 110 includes a command handler 112 which receives the requests originating from client device 195 and passes commands included in the requests to a business logic block 114 of logic board 110. Business logic block 114 interprets the commands and provides appropriate signals (e.g., through direct signaling, another protocol, and/or other appropriate techniques) to camera core 120, focus motor 130, and/or heater 140 to execute the commands. Business logic block 114 also generates appropriate responses that are sent back to client device 195 by command handler 112.

As discussed, commands may identify a group which refers to a set of functions. Accordingly, commands may be routed to particular components of camera system 100 based on a particular group identified in a command. In the example shown in FIG. 1, various groups and functions associated with camera core 120, focus motor 130, and heater 140 are illustrated conceptually within logic board 110. In particular, a group 150 of functions 160 is associated with focus motor 130, a group 152 of functions 162 is associated with heater 140, a group 156 of functions 164 is associated with camera core 120, and another group 158 of functions 166 is associated with camera core 120.

In one embodiment, one or more commands may be used to trigger one or more of functions 162 to use heater 140 to adjust humidity levels of camera system 100. For example, such commands may cause heater 140 to operate in accordance with an appropriate humidity control method or humidity reduction method set forth in U.S. patent application Ser. No. 11/946,805 filed on Nov. 28, 2007 and entitled "HUMIDITY CONTROL SYSTEMS AND METHODS FOR INFRARED CAMERAS" which is incorporated herein by reference in its entirety.

In the example of FIG. 1, only a single command handler 112 and a single instance of business logic block 114 are provided. As such, all commands to be executed by camera system 100 are received by command handler 112 and passed to business logic block 114 for execution based on a routing table maintained by command handler 112. Accordingly, this implementation may be considered a single tier implementation in which commands are handled at a single tier (e.g., a single hierarchical level).

Thus, in one embodiment, camera system 100 may receive a request from client device 195 including a help command formatted as: ?help. In reply, camera system 100 may provide a response in JSON format as follows:

```
{ type: tube,
    focus : { percent, distance },
    AGC : { algo, brightness },
    mode : { blackhot, invert },
    heater : { heat }
}
```

In this example, "tube" refers to camera system 100, "focus" refers to group 150, "AGC" (automatic gain control) refers to group 156, "mode" refers to group 158, and "heater" refers to group 152. Accordingly, it will be appreciated that the JSON response of this example returns a status value for various functions in the groups associated with focus motor 130, camera core 120, and heater 140. As a result, client device 195 may ascertain the various groups and functions supported by components of camera system 100.

Figure 2:
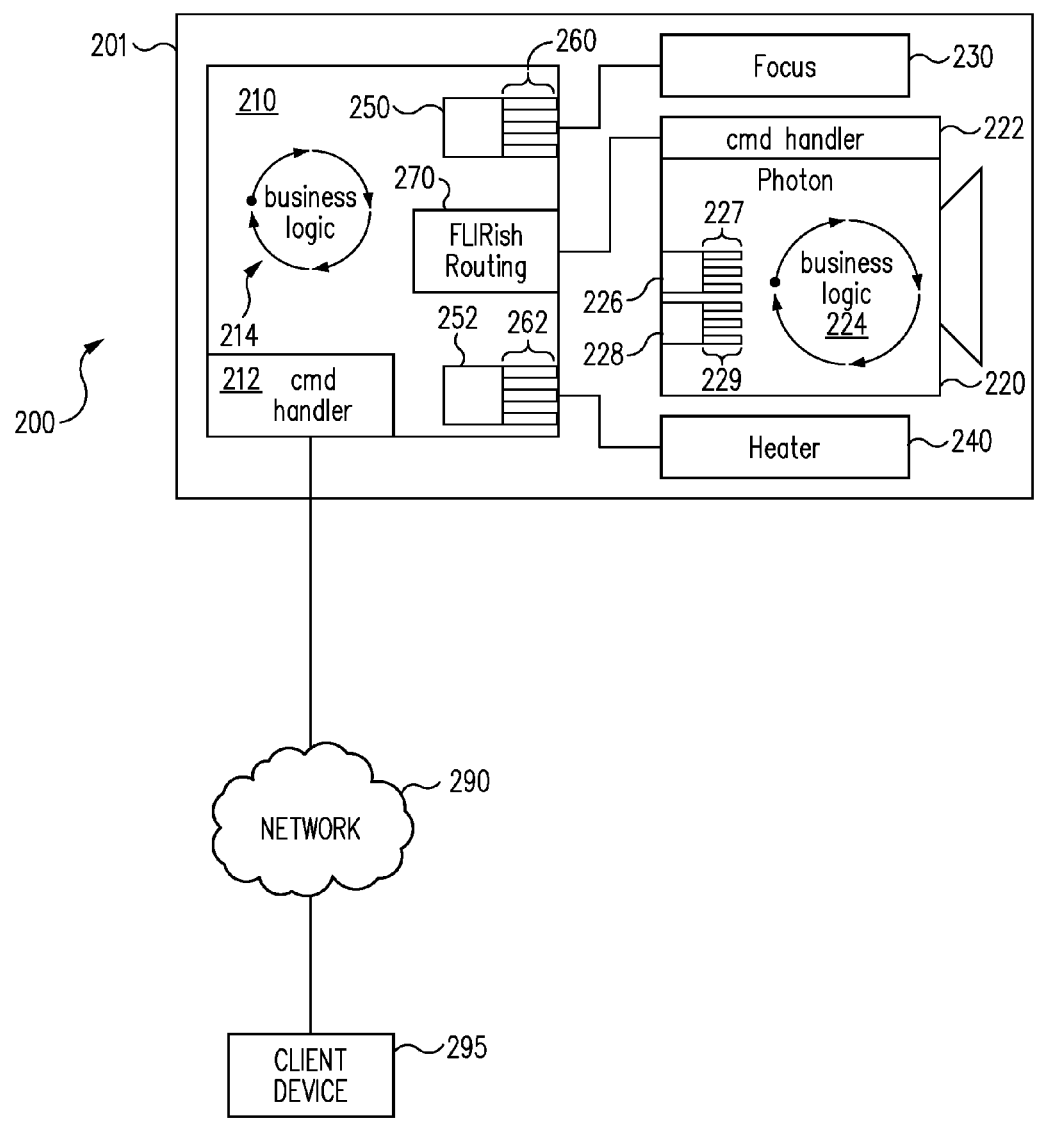

FIG. 2 illustrates a camera system 200 in communication with a client device 295 over a network 290 in accordance with an embodiment. Camera system 200 includes a camera 201 having a logic board 210, a camera core 220, a focus motor 230, and a heater 240.

Similar to logic board 110 of FIG. 1, logic board 210 receives requests from client device 295 in accordance with the camera control protocol over an appropriate interface. Logic board 210 includes a command handler 212 which receives the requests originating from client device 295 and passes commands included in the requests to a business logic block 214 of logic board 210. Business logic block 214 interprets the commands and provides appropriate signals to focus motor 230, and/or heater 240 to execute the commands. Business logic block 214 also generates appropriate responses that are sent back to client device 295 by command handler 212.

As also shown in FIG. 2, logic board 210 further includes a routing block 270 (labeled "FLIRish Routing") which routes commands passed by the logic board's command handler 212 to camera core 220 based on a routing table maintained by command handler 212. Advantageously, logic board 210 is not required to interpret the commands directed to camera core 220. Rather, logic board 210 passes such commands to camera core 220 through routing block 270.

As further shown in FIG. 2, camera core 220 includes a command handler 222 and a business logic block 224. In this regard, commands passed by logic board 210 to camera core 220 are received by the camera core's command handler 222 which passes them to the camera core's business logic block 224 based on a routing table maintained by command handler 222.

Similar to business logic block 214 of logic board 210, the camera core's business logic block 224 interprets commands and provides appropriate signals to camera core 220 to execute the commands, and also sends appropriate responses to the commands back to the camera core's command handler 222. Such responses are passed from the camera core's command handler 222 to the logic board's routing block 270 which in turn passes them to the logic board's command handler 212 which forwards the responses to client device 295.

In the example shown in FIG. 2, groups 250/252 and functions 260/262 associated with focus motor 230 and heater 240 are illustrated conceptually within logic board 210. In addition, groups 226/228 and functions 227/229 associated with camera core 220 are illustrated conceptually within camera core 220.

Camera system 200 of FIG. 2 provides a multi-tiered approach to the processing of requests and responses. Specifically, logic board 210, focus motor 230, and heater 240 provide a first tier, and camera core 220 provides a second tier that is hierarchically lower than the first tier. In this regard, commands directed to components of the first tier are processed by command handler 212 and business logic block 214 of logic board 210. Commands directed to components of the second tier are processed by command handler 222 and business logic block 224 of camera core 220.

Thus, if camera core 220 is upgraded to include support for additional features corresponding to new commands, logic board 210 is not required to understand the particular manner in which such commands are executed by camera core 220. Instead, business logic block 224 of camera core 220 may be configured to interpret the commands which are passed by logic board 210 to camera core 220 through routing block 270. Thus, for example, logic board 210 does not necessarily need to be upgraded when camera core 220 is upgraded to include additional features.

In addition, because camera core 220 includes its own command handler 222 and business logic block 224, camera core 220 may also receive and process commands that are generated by logic board 210 (e.g., commands that are not received from logic board 210 from client device 295). In this regard, if business logic block 214 of logic board 210 generates a request having a command directed to camera core 220, routing block 270 may route such a command to camera core 220. Upon processing of the command by the camera core's business logic block 224, camera core 220 may send back a response directed to logic board 210. Because the original request was generated by logic board 210, this response need not be forwarded by logic board 210 to client device 295.

In one embodiment, camera system 200 may receive a request from client device 295 including an instance-based help command formatted as: ?help. In reply, camera system 200 may provide a response in JSON format as follows:

```
{ type: tube,
    focus : { percent, distance },
    photon1 : { type : photon,
        AGC : { algo, brightness },
        mode : { blackhot, invert }
    },
    heater : heat
}
```

In this example, "tube" refers to camera system 200, "focus" refers to group 250, "photon1" refers to camera core 220, "AGC" refers to group 226, "mode" refers to group 228, and "heater" refers to group 252. In comparison with the JSON response for camera system 100, it will be appreciated that the JSON response for camera system 200 nests groups 226 and 228 within camera core 220 to identify that the commands associated with such groups are handled and processed by command handler 222 and business logic block 224 of camera core 220.

Figure 3:
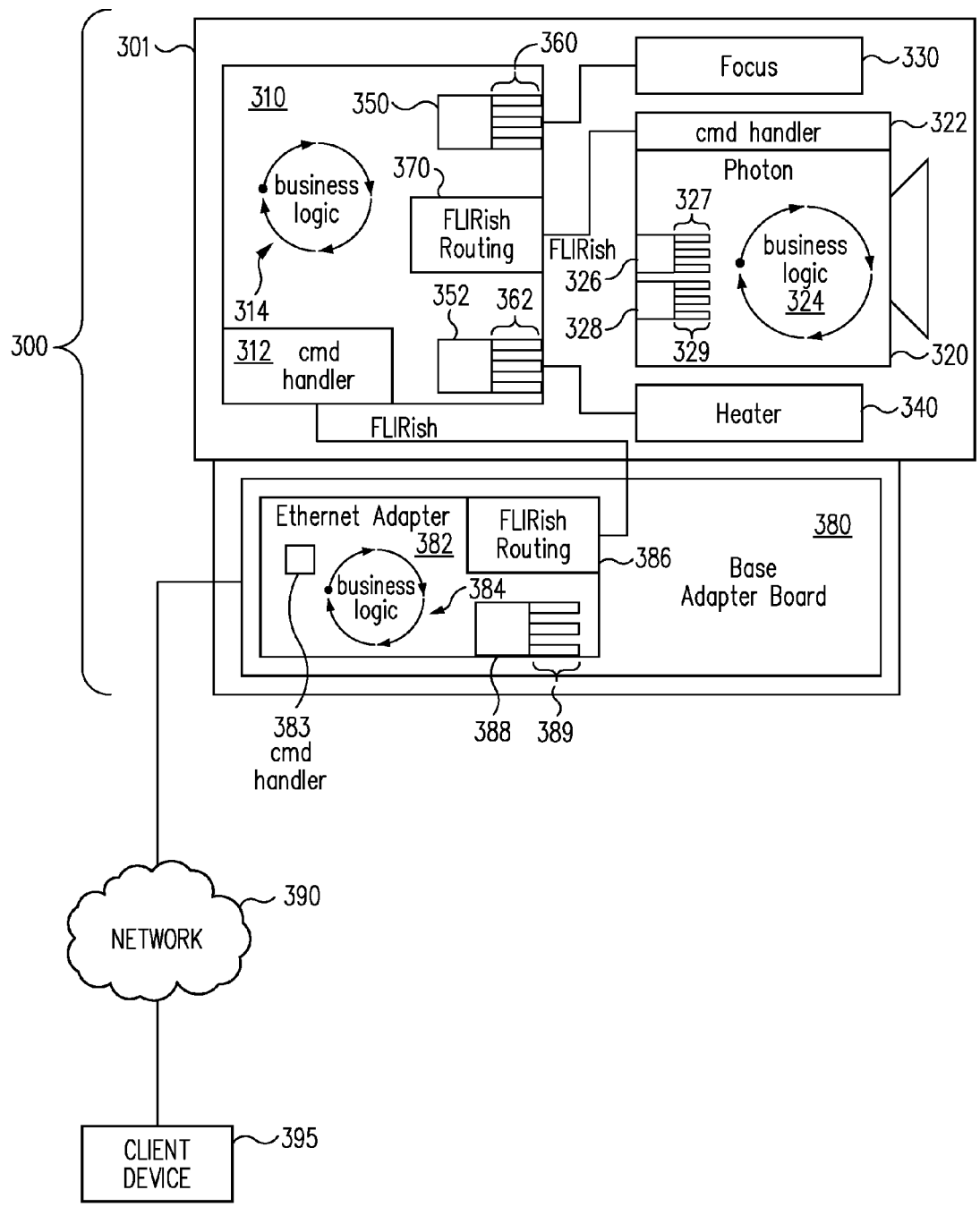

FIG. 3 illustrates a camera system 300 including a camera 301 and an adapter board 380 in communication with a client device 395 over a network 390 in accordance with an embodiment. As shown, camera 301 includes various components 310 through 370 corresponding to similar components of camera 201.

Adapter board 380 receives requests in accordance with the camera control protocol over an appropriate interface from client device 395 over a network 390. Adapter board 380 includes a network adapter 382 (e.g., an Ethernet or other appropriate adapter) having a command handler 383, a business logic block 384, and a routing block 386. A group 388 of functions 389 associated with adapter board 380 is also illustrated conceptually within network adapter 382. For example, in one embodiment, adapter board 380 may include additional components for performing various functions, such as pan and tilt functions to adjust the positioning of camera 301 (e.g., represented by functions 389 in FIG. 3).

Adapter board 380 selectively executes or routes commands based on a routing table maintained by command handler 383. For example, adapter board 380 may execute commands directed to adapter board 380 itself (e.g., commands for performing pan/tilt functions) using business logic block 384. As another example, adapter board 380 may route commands directed to logic board 310 or camera core 320 using routing block 386.

Command handler 312 in turn executes commands directed to logic board 310, focus motor 330, or heater 340, and passes commands directed to camera core 320 on to camera core 320 to be interpreted locally at camera core 320 by a business logic block 324. Similar to logic board 210 of FIG. 2, adapter board 380 of FIG. 3 may also generate commands and receive corresponding responses.

Thus, it will be appreciated that camera system 300 of FIG. 3 provides another example of a multi-tiered approach to the processing of requests and responses. Specifically, camera system 300 includes three tiers: (1) a first tier provided by adapter board 380; (2) a second tier provided by logic board 310, focus motor 330, and heater 340; and (3) a third tier provided by camera core 320. In this regard, the second tier is hierarchically lower than the first tier, and the third tier is hierarchically lower than the second tier. Commands directed to components of the first tier are processed by command handler 383 and business logic block 384 of adapter board 380. Commands directed to components of the second tier are processed by command handler 312 and business logic block 314 of logic board 310. Commands directed to components of the third tier are processed by command handler 322 and business logic block 324 of camera core 320.

In one embodiment, camera system 300 may receive a request from client device 395 including a help command with a device identifier (e.g., identifying a device number 3) formatted as: ?3::help. In reply, camera system 300 may provide a response in JSON format as follows:

```
{ dev : 3,
    type : PTZ300,
    ptz : {pan, tilt},
    tube1 : {type : tube,
        focus : {percent, distance},
        photon1 : {type : photon,
            AGC : {algo,brightness},
            mode : {blackhot,invert},
            group : {func, func}
        },
        heater : heat
    }
}
```

In this example, camera system 300 is identified as a PTZ300 camera system, "ptz" refers to group 388, "tube1" refers to camera 301, "focus" refers to group 350, "photon1" refers to camera core 320, "AGC" refers to group 326, "mode" refers to group 328, and "heater" refers to group 352. In comparison with the JSON response for camera system 200, it will be appreciated that the JSON response for camera system 300 nests the information for camera core 320 within the information for camera 301, which is further nested within the information for camera system 300 (e.g., the device associated with the device identifier specified in the help command).

Figure 4:
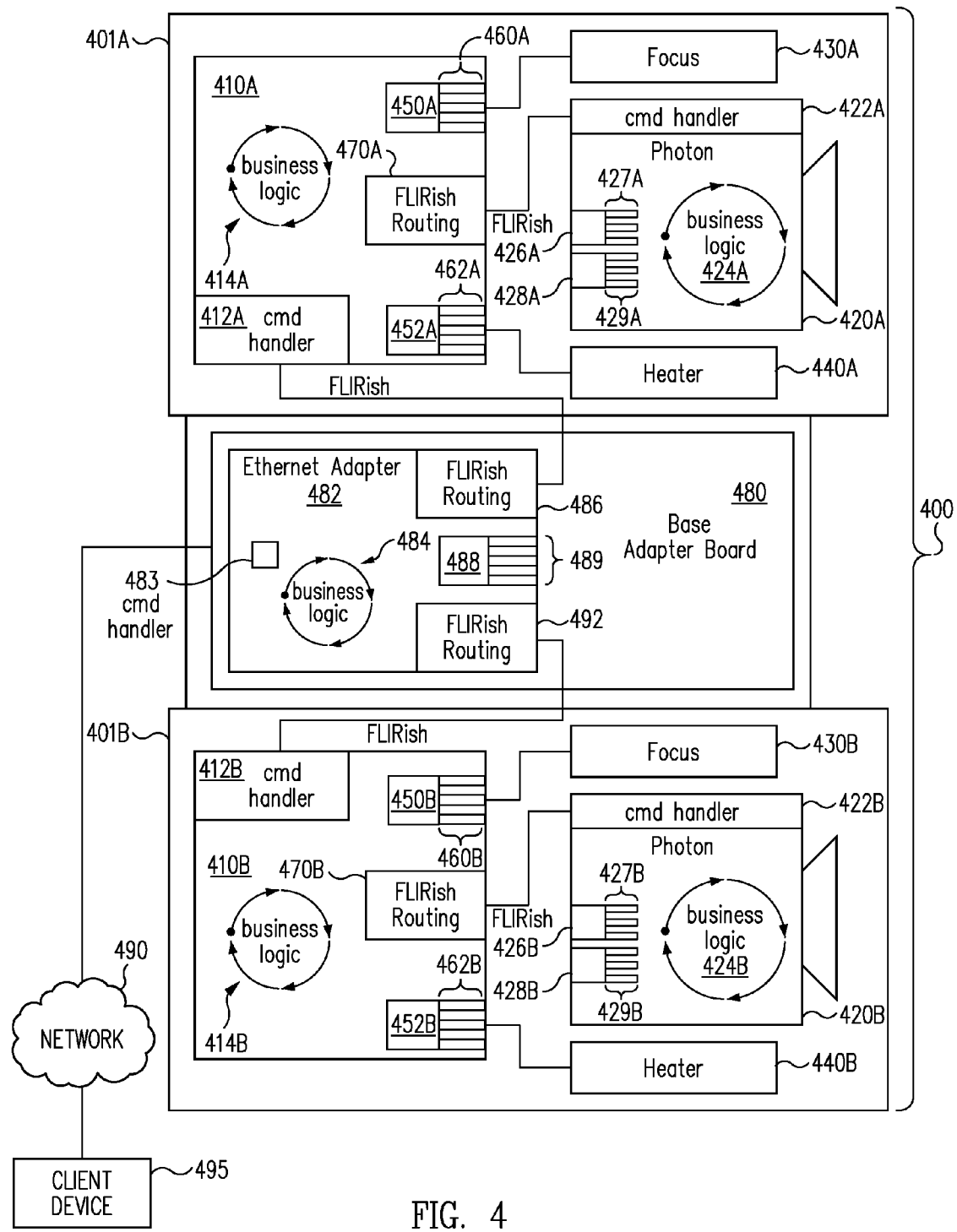

FIG. 4 illustrates a camera system 400 including a camera 401A, a camera 401B, and an adapter board 480 in communication with a client device 495 over a network 490 in accordance with an embodiment. As shown, cameras 401A/401B include various components 410A/410B through 470A/470B corresponding to similar components of cameras 201 and 301.

In addition, adapter board 480 includes various components 482 through 489 corresponding to similar components of adapter board 380. Adapter board 480 further includes a routing block 492 for passing commands directed to logic board 410B or camera core 420E on to logic board 410B.

Thus, it will be appreciated that camera system 400 of FIG. 4 provides another example of a multi-tiered approach to the processing of requests and responses. Specifically, camera system 400 includes three tiers: (1) a first tier provided by adapter board 480; (2) a second tier provided by logic boards 410A/410B, focus motors 430A/430B, and heaters 440A/440B; and (3) a third tier provided by camera cores 420A/420B. In this embodiment, the second tier is hierarchically lower than the first tier, and the third tier is hierarchically lower than the second tier. Commands directed to components of the first tier are processed by command handler 483 and business logic block 484 of adapter board 480. Commands directed to components of the portion of the second tier in camera 401A are processed by command handler 412A and business logic block 414A of logic board 410A. Commands directed to components of the portion of the second tier in camera 401B are processed by command handler 412B and business logic block 414B of logic board 410B. Commands directed to components of the portion of the third tier in camera core 420A are processed by command handler 422A and business logic block 424A. Commands directed to components of the portion of the third tier in camera core 420B are processed by command handler 422B and business logic block 424B.

In one embodiment, camera system 400 may receive a request from client device 495 including a help command with a device identifier (e.g., identifying a device number 3) formatted as: ?3::help. In reply, camera system 400 may provide a response in JSON format as follows:

```
{ dev : 3,
    type : PTZ300,
    ptz : {pan, tilt},
    tube1 : { type : tube,
        focus : {percent, distance},
        photon1 : {type : photon,
            AGC :{algo,brightness},
            mode :{blackhot,invert}
        },
        heater : heat
    }
    tube2: {type : tube,
        focus : {percent, distance},
        photon1 : {type : photon,
            AGC :{algo,brightness},
            mode :{blackhot,invert}
        },
        heater : heat
    }
}
```

In this example, camera system 400 is identified as a PTZ300 camera system, "ptz" refers to group 488, "tube1" refers to camera 401A, and "tube2" refers to camera 401B. In tube1 (camera 401A), "focus" refers to group 450A, "photon1" refers to camera core 420A, "AGC" refers to group 426A, "mode" refers to group 428A, and "heater" refers to group 452A. In tube2 (camera 401B), "focus" refers to group 450B, "photon1" refers to camera core 420B, "AGC" (automatic gain control) refers to group 426B, "mode" refers to group 428B, and "heater" refers to group 452B.

In comparison with the JSON response for camera system 300, will be appreciated that the JSON response for camera system 400 nests the information for two cameras 401A and 401B within the information for camera system 400 (e.g., the device associated with the device identifier specified in the help command).

As discussed, commands may be routed based on one or more routing tables maintained by various components of camera systems. For example, one or more routing tables may be maintained for each tier of a camera system. In one embodiment, a routing table for a given tier may identify functions performed by the tier and any lower tiers, but may not identify functions performed by higher tiers. Accordingly, a particular tier may be able to route commands to lower level tiers for processing and execution, but need not maintain knowledge of commands supported by higher level tiers.

In one embodiment, a routing table may include a plurality of entries with each entry including four fields: component, group, function, and handler. The component field identifies a component of a camera system that is associated with the current tier or a lower level tier. The group field identifies a group of functions associated with the identified component. The function field identifies a particular function within the group of functions. The handler field is a pointer to a location (e.g., a software location in the current tier or a lower level tier) that handles the interpretation and execution of commands for the function.

The following Table 6 identifies a routing table that may be maintained, for example, by command handler 422A in camera core 420A of FIG. 4.

TABLE 6

| Component | Group | Function | Handler |
|---|---|---|---|
| null | AGC | Algo | self |
| null | AGC | brightness | self |
| null | mode | blackhot | self |
| null | mode | Invert | self |

In Table 6, four functions are associated with camera core 420A (e.g., the third tier) of camera system 400. Null values in the component fields identify that commands for these functions are handled by the current tier (e.g., camera core 420A). The functions (corresponding to functions 427A and 429A) are associated with two groups (corresponding to groups 426A and 428A). Self values in the handler fields provide pointers to software in camera core 420A (such as business logic block 424A) which may be used to execute commands directed to the specified functions. A similar routing table may also be maintained, for example, by command handler 422B in camera core 420B of FIG. 4.

The following Table 7 identifies a routing table that may be maintained, for example, by command handler 412A in logic board 401A of FIG. 4.

TABLE 7

| Component | Group | Function | Handler |
|---|---|---|---|
| Null | focus | percent | self |
| Null | focus | distance | self |
| null | heater | heat | self |
| photon1 | AGC | algo | photon |
| photon1 | AGC | brightness | photon |
| photon1 | mode | blackhot | photon |
| photon1 | Mode | invert | photon |

In Table 7, three functions are identified that are associated with logic board 410A (e.g., the second tier) of camera system 400. Null values in the component fields identify that commands for these functions are handled by the current tier (e.g., logic board 410A). The functions (corresponding to functions 460A and 462A) are associated with two groups (corresponding to groups 450A and 452A). Self values in the handler fields provide pointers to software in logic board 410A (such as business logic block 414A) which may be used to execute commands directed to the specified functions.

Table 7 also identifies the four functions of Table 6. In this regard, Table 7 identifies that commands for these functions are routed to the component "photon1" which corresponds to camera core 420A in this example. Thus, it will be appreciated that by referencing Table 7, logic board 410A may selectively process commands at the second tier or route commands on to the third tier (e.g., route commands to camera core 420A through routing block 470A). A similar routing table may also be maintained, for example, by command handler 412B in logic board 401B of FIG. 4.

The following Table 8 identifies a routing table that may be maintained, for example, by command handler 483 in adapter board 480 of FIG. 4.

TABLE 8

| Component | Group | Function | Handler |
|---|---|---|---|
| null | ptz | pan | self |
| null | ptz | tilt | self |
| tube1 | focus | percent | tube-1 |
| tube1 | focus | distance | tube-1 |
| tube1 | AGC | algo | tube-1 |
| tube1 | heater | heat | tube-1 |
| tube1 | AGC | brightness | tube-1 |
| tube1 | mode | blackhot | tube-1 |
| tube1 | mode | invert | tube-1 |
| tube2 | focus | percent | tube-2 |
| tube2 | focus | distance | tube-2 |
| tube2 | AGC | algo | tube-2 |
| tube2 | heater | heat | tube-2 |
| tube2 | AGC | brightness | tube-2 |
| tube2 | mode | blackhot | tube-2 |
| tube2 | mode | invert | tube-2 |

In Table 8, two functions are identified that are associated with adapter board 480 (e.g., the first tier) of camera system 400. Null values in the component fields identify that commands for these functions are handled by the current tier (e.g., adapter board 480). The functions (corresponding to functions 489) are associated with a group (corresponding to group 488). Self values in the handler fields provide pointers to software in adapter board 480 (such as business logic block 484) which may be used to execute commands directed to the specified functions.

Table 8 also identifies the seven functions of Table 7. In this regard, Table 8 identifies that such functions are routed to the component "tube1" which corresponds to camera 401A in this example. Table 8 further identifies seven functions that are routed to the component "tube2" which corresponds to camera 401B in this example.

Thus, it will be appreciated that by referencing Table 8, adapter board 480 may selectively process commands at the first tier or route commands on to the second tier (e.g., route commands to camera 401A or 401D through routing block 486 or 492).

Figure 5:
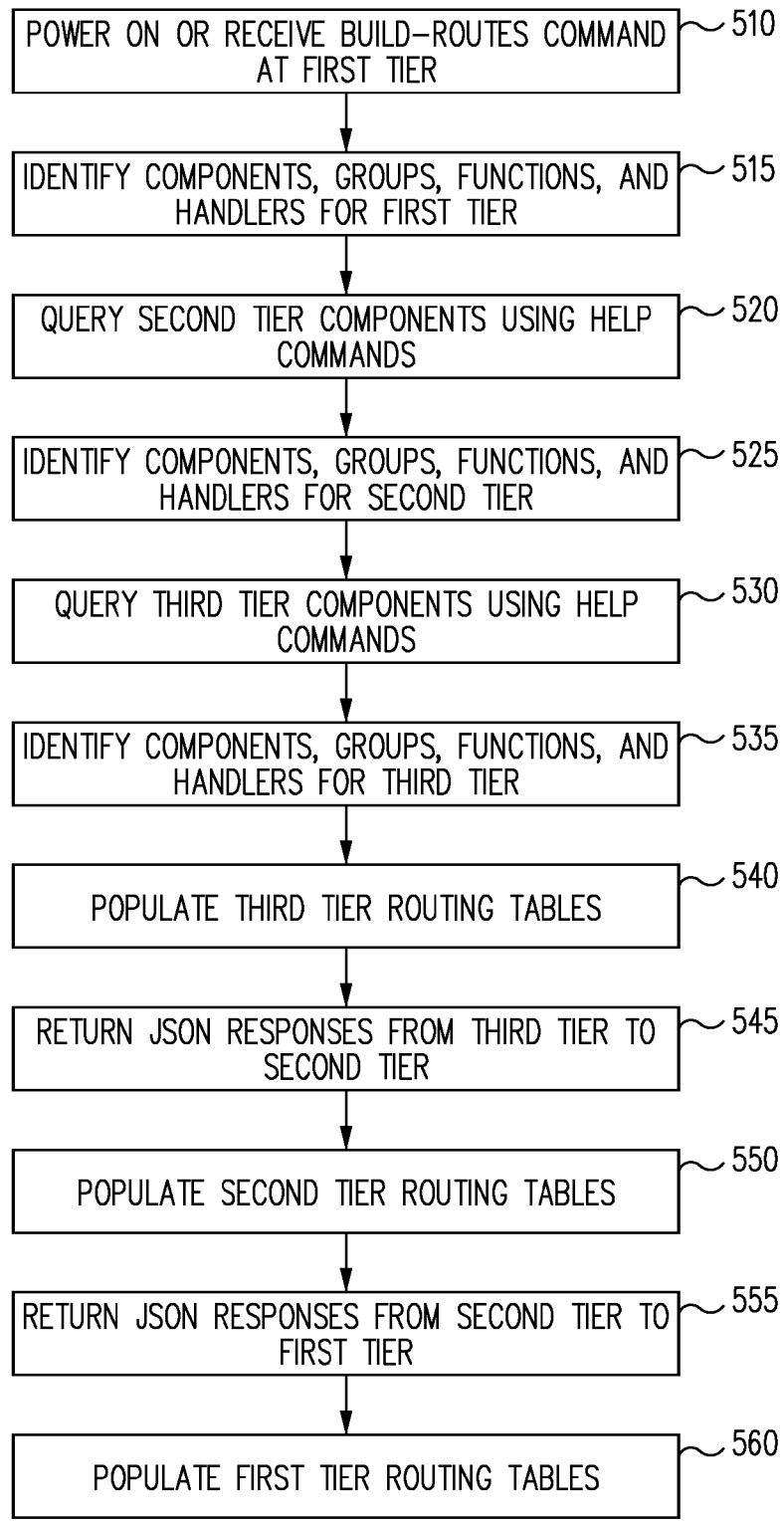
FIG. 5 illustrates a process of creating a routing table in accordance with an embodiment of the invention.

FIG. 5 illustrates a process of creating a routing table in accordance with an embodiment. The process of FIG. 5 may be implemented, for example, as a recursive process performed in response to either a startup (e.g., powering on) of a camera system or receipt of a build-routes command. Each tier of the camera system may identify its associated components as well as groups, functions, and handlers used for executing commands at the tier. Each tier may also query the next lower tier (e.g., using a help command) to receive such information from the next lower tier. For example, a first tier may query a second tier, a second tier may query a third tier, and so on until the lowest tier has been queried. Information from the lowest tier may be used to populate one or more routing tables of the lowest tier. Such information may be passed up to higher level tiers such that each tier may maintain one or more routing tables identifying the associated information for all lower level tiers.

The process of FIG. 5 will be described with regard to camera system 400 of FIG. 4. However, it will be appreciated that the process may be applied to other camera systems where appropriate.

In operation 510, camera system 400 powers on or receives a build-routes command at its first tier. For example, in one embodiment, the build-routes command may be sent by client device 495 and received by command handler 483 of adapter board 480.

In operation 515, command handler 483 identifies components of the first tier as well as groups, functions, and handlers associated with the first tier. In this example, command handler 483 identifies group 488 and functions 489 which are handled by adapter board 480 (e.g., processed by business logic block 484 and executed by adapter board 480 without being routed to the second or third tiers).

In operation 520, the first tier queries the second tier. In this example, command handler 483 sends help commands to command handlers 412A/412B of the second tier of camera system 400.

In operation 525, command handlers 412A and 412B each identify components of the second tier as well as groups, functions, and handlers associated with the second tier. In this example, command handler 412A identifies groups 450A/452A and functions 460A/462A which are handled by logic board 410A (e.g., processed by business logic block 414A and executed by logic board 410A without being routed to the third tier). Similarly, command handler 4122 identifies groups 450B/452B and functions 4602/4622 which are handled by logic board 4102 (e.g., processed by business logic block 414B and executed by logic board 410B without being routed to the third tier).

In operation 530, the second tier queries the third tier. In this example, command handlers 412A/412B send help commands to command handlers 422A/422B of the third tier of camera system 400.

In operation 535, command handlers 422A and 422B each identify components of the third tier as well as groups, functions, and handlers associated with the third tier. In this example, command handler 422A identifies groups 426A/428A and functions 427A/429A which are handled by camera core 420A (e.g., processed by business logic block 424A and executed by camera core 420A without being routed to any lower tier). Similarly, command handler 422B identifies groups 426B/428B and functions 427B/429B which are handled by camera core 420B (e.g., processed by business logic block 424B and executed by camera core 420B without being routed to any lower tier).

Because no lower tiers remain, camera cores 420A/B need not send any queries to other components. However, it will be appreciated that any desired number of tiers may be used and any desired number of query and identification operations may be performed in such embodiments.

In operation 540, command handlers 422A/422B of the third tier populate their associated routing tables with the information identified in operation 535 (e.g., as set forth in Table 6). In operation 545, command handlers 422A/422B return JSON responses (including the information identified in operation 535) from the third tier to command handlers 412A/412B of the second tier.

In operation 550, command handlers 412A/412B of the second tier populate their associated routing tables with the information identified in operations 525 and 535 (e.g., as set forth in Table 7). In operation 555, command handlers 412A/412B return JSON responses (including the information identified in operations 525 and 535) from the second tier to command handler 483 of the first tier.

In operation 560, command handler 483 of the first tier populates its associated routing table with the information identified in operations 515, 525, and 535 (e.g., as set forth in Table 8). Thus, following the process of FIG. 5, routing tables will have been populated for all tiers of camera system 400. In other embodiments, greater or fewer numbers of routing tables may be populated as may be appropriate for particular implementations.

Figure 6:
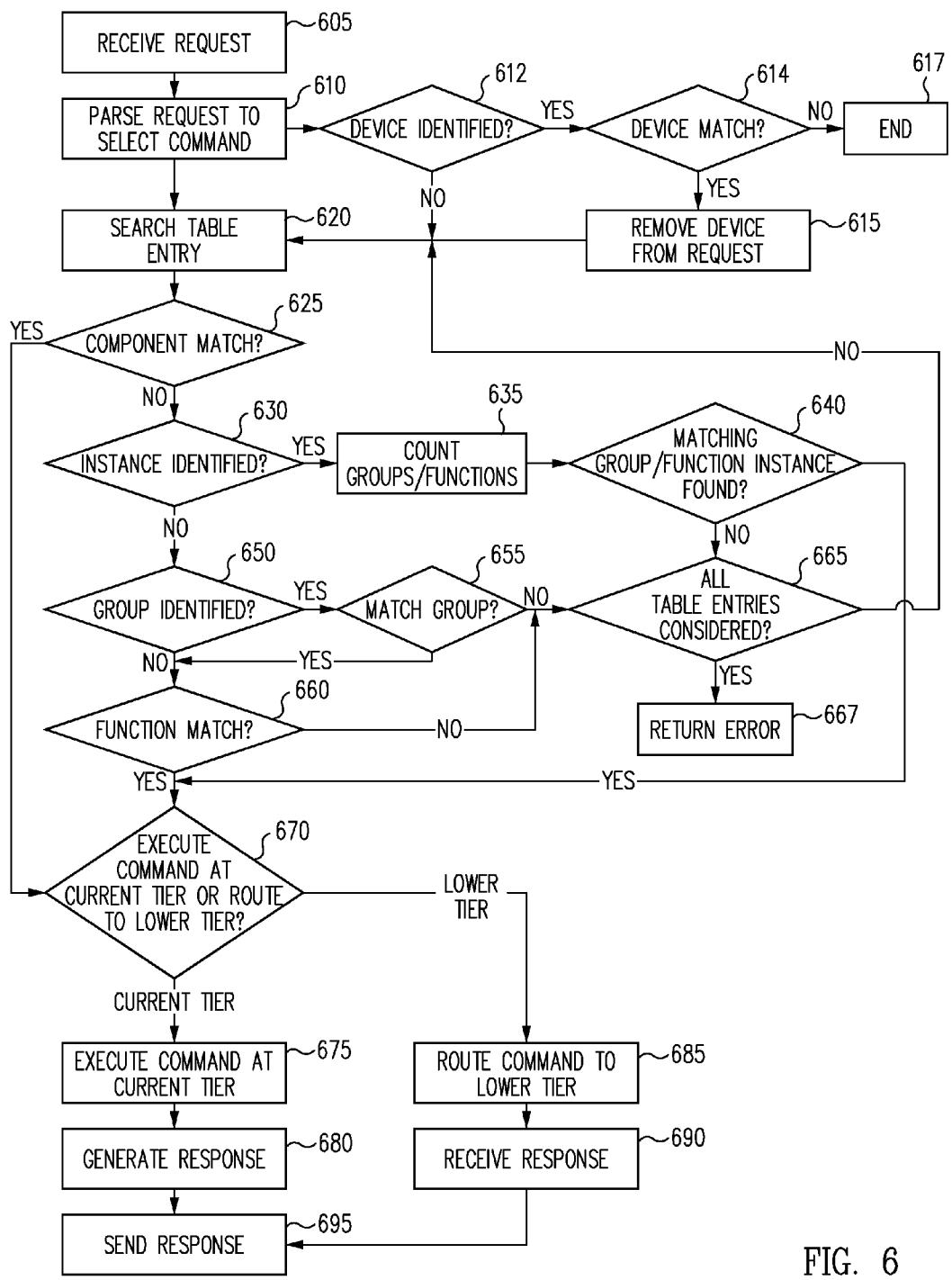
FIG. 6 illustrates a process of routing commands and responses in accordance with an embodiment of the invention.

FIG. 6 illustrates a process of routing commands and responses in accordance with an embodiment. The process of FIG. 6 may be performed, for example, using routing tables of a camera system. In this regard, the process of FIG. 6 will be described with regard to camera system 400 of FIG. 4. However, it will be appreciated that the process may be similarly applied to other camera systems where appropriate.

In operation 605, camera system 400 receives a request including one or more commands in accordance with the camera control protocol. For example, in one embodiment, the request may be sent by client device 495 and received by command handler 483 of adapter board 480.

In operation 610, command handler 483 parses the request and selects a command in the request. As discussed, the command may be implemented as a path-based command in one embodiment or an instance-based command in another embodiment.

In operation 612, command handler 483 determines whether the request identifies a particular device. If a device is identified, then the process continues to operation 614. Otherwise, the process continues to operation 620.

In operation 614, command handler 483 determines whether the device identified in the request matches camera system 400. If the device matches camera system 400, then command handler 483 removes the device identifier from the request (operation 615) and the process continues to operation 620. Otherwise, the process ends (operation 617).

In operation 620, command handler 483 selects and searches an entry in the routing table for the first tier of camera system 400 (e.g., Table 8 maintained by command handler 483) and compares the entry with information included in the command.

In operation 625, command handler 483 determines whether the command identifies a component in accordance with a path-based command format that matches a component field in the selected entry in the routing table. If a match is found, then the process continues to operation 670. Otherwise, the process continues to operation 630.

In operation 630, command handler 483 determines whether the command identifies an instance value in accordance with the instance-based command format as discussed. If an instance value is provided, then the process continues to operation 635. Otherwise, the process continues to operation 650.

In operation 635, command handler 483 checks whether the current table entry includes a matching group and/or function and increases a match count value if a match is found. If the match count value equals the instance value specified in the command (operation 640), then the process continues to operation 670. Otherwise, the process continues to operation 665.

In operation 665, if all entries of the routing table have been considered, then command handler 483 provides a response to client device 495 indicating an error (operation 667). Otherwise, if additional routing table entries remain to be considered, then the process returns to operation 620 in which the next entry in the routing table is selected and searched.

In operation 650, command handler 483 determines whether the command identifies a group value in accordance with the path-based command format as discussed. If so, the process continues to operation 655. Otherwise, the process continues to operation 660.

In operation 655, command handler 483 determines whether the group value matches a group field in the current routing table entry. If a match is found, then the process continues to operation 660. Otherwise, the process continues to operation 665 as discussed.

In operation 660, command handler 483 determines whether the command identifies a function that matches a function field in the current routing table entry. If a match is found, then the process continues to operation 670. Otherwise, the process continues to operation 665 as discussed.

In operation 670, command handler 483 determines whether the command is executed or routed based on a location identified in the handler field of the matching routing table entry. If the matching routing table entry includes a handler value of "self," this indicates that the command is executed by the current tier (e.g., the first tier) and the process continues to operation 675. In operation 675, the command is executed by business logic block 484 of adapter board 480. In operation 680, business logic block 484 generates a response to the command and then continues to operation 695.

Referring again to operation 670, if the matching routing table entry includes a different handler value, this indicates that the command is routed to a lower tier for execution (e.g., the second tier) and the process continues to operation 685.

In one embodiment, when a path-based command is routed in operation 685 to a device or component, the device or component is removed from the path of the command, if present. In another embodiment, when an instance-based command is routed in operation 685 based on a particular instance of a group and/or function, the corresponding instance value is reduced by the number of matching instances associated with the current tier and/or the number of matching instances associated with components of other tiers not matching a component field specified by the command.

In operation 685, command handler 483 routes the command to command handler 412A or 412B of the second tier. In this regard, command handler 412A or 412B may search its own associated routing table (e.g., Table 7) and selectively execute or route the command to a lower tier (e.g., the third tier) in a similar fashion as described for the first tier in the process of FIG. 6. If the command is routed to command handler 422A or 422B of the third tier, then command handler 422A or 422B may search its own associated routing table (e.g., Table 6) and selectively execute or route the command to a lower tier (e.g., no lower tiers are provided in this example) in a similar fashion as described for the first tier in the process of FIG. 6. In operation 690, command handler 483 receives a response from the execution of the command (e.g., by the second or third tier).

In operation 695, command handler 483 sends a response to client device 495. In this regard, the response may be either a response generated by the first tier in operation 680 or a response generated by the second or third tier based on the execution of the command routed in operation 685.

Thus, the process of FIG. 6 allows a command included in a request sent to camera system 400 to be selectively routed and executed in accordance with routing tables maintained by various tiers of camera system 400. It will be appreciated that various operations of FIG. 6 may be repeated in an iterative fashion to route and execute multiple commands and requests as may be desired in particular implementations for camera systems 100, 200, 300, 400, or other systems.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. Where applicable, it is contemplated that software components may be implemented as hardware components, and vice-versa. Where applicable, the ordering of various steps and operations described herein may be changed, combined into composite steps or operations, and/or separated into sub-steps or sub-operations to provide features described herein.

Software in accordance with the present disclosure, such as program code and/or data, may be stored on one or more machine readable mediums. Such software may be implemented, for example, in general purpose or specific hardware, computers, and/or computer systems (e.g., supporting networked communications and/or direct signaling).

While the invention has been described in detail in connection with only a limited number of embodiments, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A method of controlling a camera system comprising a plurality of tiers of components, the method comprising:
    receiving a first command at a first one of the tiers of the camera system;
    comparing the first command to a first routing table of the first tier, wherein the first routing table identifies commands executed by a first business logic block of the first tier and commands executed by a second business logic block of a second one of the tiers of the camera system;
    executing the first command at the first business logic based on the comparing of the first command;
    receiving a second command at the first tier;
    comparing the second command to the first routing table;
    routing the second command to the second tier based on the comparing of the second command to the first routing table; and
    comparing the second command to a second routing table of the second tier, wherein the second routing table identifies commands executed by the second business logic block but does not identify commands executed by the first business logic block.

2. The method of claim 1, further comprising querying the second tier to populate the first routing table with routing information that identifies commands executed by the second business logic block.

3. The method of claim 1, wherein the first tier comprises a camera and the second tier comprises a camera core of the camera.

4. The method of claim 1, wherein the first command comprises a path identifying a plurality of the components of the camera system.

5. The method of claim 1, wherein the first command comprises an instance value identifying a function supported by at least one of the components of the first or second tiers.

6. The method of claim 1, wherein the first or second business logic block is adapted to generate a response to the second command.

7. The method of claim 1, wherein the first routing table is maintained by a first command handler of the first tier and the second routing table is maintained by a second command handler of the second tier.

8. The method of claim 1, further comprising:
- executing the second command at the second business logic block based on the comparing of the second command to the second routing table;
- receiving a third command at the first tier;
- comparing the third command to the first routing table, wherein the first routing table further identifies commands executed by the third business logic block;
- routing the third command to the second tier based on the comparing of the third command to the first routing table;
- comparing the third command to the second routing table, wherein the second routing table further identifies commands executed by the third business logic block;
- routing the third command to a third tier based on the comparing of the third command to the second routing table; and
- comparing the third command to a third routing table of the third tier, wherein the third routing table identifies commands executed by a third business logic block of the third tier but does not identify commands executed by the first business logic block or the second business logic block.

9. The method of claim 8, wherein the first tier comprises an adapter board, the second tier comprises a camera, and the third tier comprises a camera core of the camera.

10. A camera system comprising:
- a first tier of components of the camera system comprising: a first command handler, a first business logic block, a first routing table, and first routing block;
- a second tier of components of the camera system comprising: a second command handler, a second business logic block, and a second routing table;
- wherein the first command handler is adapted to receive first and second commands, and compare the first and second commands to the first routing table;
- wherein the first routing table identifies commands executed by the first business logic block and commands executed by the second business logic block;
- wherein the first business logic block is adapted to execute the first command based on the compare of the first command;
- wherein the first routing block is adapted to route the second command to the second tier based on the compare of the second command;
- wherein the second command handler is adapted to compare the second command to the second routing table; and
- wherein the second routing table identifies commands executed by the second business logic block but does not identify commands executed by the first business logic block.

11. The camera system of claim 10, wherein the first command handler is adapted to query the second command handler to populate the first routing table with routing information that identifies commands executed by the second business logic block.

12. The camera system of claim 10, wherein the first tier comprises a camera and the second tier comprises a camera core of the camera.

13. The camera system of claim 10, wherein the first command comprises a path identifying a plurality of the components of the camera system.

14. The camera system of claim 10, wherein the first command comprises an instance value identifying a function supported by at least one of the components of the first or second tiers.

15. The camera system of claim 10, wherein the second business logic block is adapted to generate a response to the second command.

16. The camera system of claim 10, wherein the first routing table is maintained by the first command handler and the second routing table is maintained by the second command handler.

17. The camera system of claim 10, further comprising:
- a third tier of components comprising: a third command handler, a third business logic block, and a third routing table;
- wherein the second business logic block is adapted to execute the second command based on the compare of the second command to the second routing table;
- wherein the first command handler is adapted to receive a third command, and compare the third command to the first routing table;
- wherein the first routing table further identifies commands executed by the third business logic block;
- wherein the first routing block is adapted to route the third command to the second tier based on the compare of the third command;
- wherein the second command handler is adapted to compare the third command to the second routing table;
- wherein the second routing table further identifies commands executed by the third business logic block;
- wherein the second tier further comprises a second routing block adapted to route the third command to the third tier based on the compare of the third command to the second routing table;
- wherein the third command handler is adapted to compare the third command to the third routing table; and
- wherein the third routing table identifies commands executed by the third business logic block but does not identify commands executed by the first business logic block or the second business logic block.

18. The camera system of claim 17, wherein the first tier comprises an adapter board, the second tier comprises a camera, and the third tier comprises a camera core of the camera.

* * * * *